United States Patent
MacDonald et al.

(10) Patent No.: US 8,761,736 B2
(45) Date of Patent: Jun. 24, 2014

(54) MODEM SIGNALING USING SPEECH COMPONENTS OVER A VOICE CHANNEL OF A WIRELESS COMMUNICATION SYSTEM

(75) Inventors: Andrew J. MacDonald, Grosse Pointe Park, MI (US); Cem U. Saraydar, Royak Oak, MI (US); Sethu K. Madhavan, Erie, PA (US)

(73) Assignees: GM Global Technology Operations LLC, Detroit, MI (US); General Motors LLC

( * ) Notice: Subject to any disclaimer, the term of this patent is extended or adjusted under 35 U.S.C. 154(b) by 306 days.

(21) Appl. No.: 12/876,443

(22) Filed: Sep. 7, 2010

(65) Prior Publication Data

US 2011/0217957 A1 Sep. 8, 2011

Related U.S. Application Data

(60) Provisional application No. 61/241,860, filed on Sep. 11, 2009.

(51) Int. Cl.
*H04J 3/00* (2006.01)
*H04L 12/28* (2006.01)
*H04M 11/00* (2006.01)

(52) U.S. Cl.
USPC ........ 455/414.1; 375/222; 370/525; 370/249; 379/93.26

(58) Field of Classification Search
USPC ........... 455/414.1, 569.2, 406, 410, 405, 407; 375/222, 240.1; 704/201; 370/525, 370/249; 379/111, 114, 357, 93.26–93.28
See application file for complete search history.

(56) References Cited

U.S. PATENT DOCUMENTS

| | | | | |
|---|---|---|---|---|
| 5,349,634 | A | * | 9/1994 | Shimomura ............. 379/100.16 |
| 7,983,310 | B2 | * | 7/2011 | Hirano et al. ................. 370/525 |
| 2007/0092024 | A1 | * | 4/2007 | Madhavan et al. ............ 375/283 |
| 2009/0117947 | A1 | * | 5/2009 | Birmingham .............. 455/569.2 |
| 2011/0164574 | A1 | * | 7/2011 | Rao et al. ...................... 370/329 |

FOREIGN PATENT DOCUMENTS

CN 101022578 8/2007

OTHER PUBLICATIONS

Office Action for German Application No. 10 2010 044 860.5, Jun. 8, 2011, 7 pages.
U.S. Appl. No. 12/901,841, filed Oct. 11, 2010.

* cited by examiner

*Primary Examiner* — Nizar Sivji
(74) *Attorney, Agent, or Firm* — Anthony Luke Simon; Reising Ethington P.C.

(57) ABSTRACT

A system and method of communicating with a modem via a voice channel of a wireless communication system. The method carried out by the system includes the steps of (a) establishing a voice channel connection between a vehicle telematics unit and call center via a wireless cellular network, (b) generating a modem signaling carrier comprising a single frequency tone together with a speech component, (c) sending the modem signaling carrier over the voice channel connection using an EVRC-B vocoder, (d) establishing a data communication session over the voice channel connection in response to the modem signaling carrier, and thereafter (e) carrying out data communications between the vehicle telematics unit and call center during the data communication session.

14 Claims, 1 Drawing Sheet

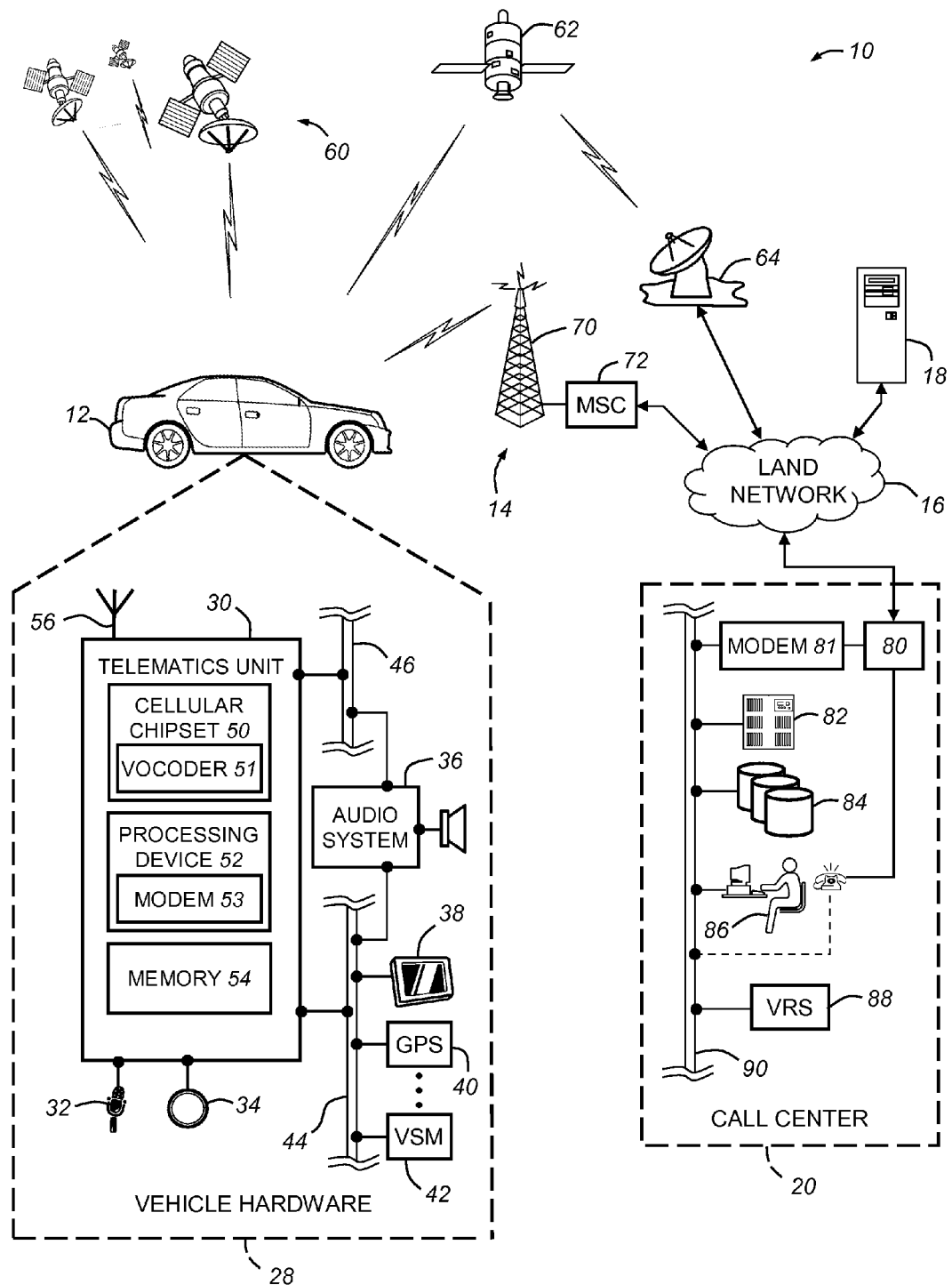

MODEM SIGNALING USING SPEECH COMPONENTS OVER A VOICE CHANNEL OF A WIRELESS COMMUNICATION SYSTEM

CROSS-REFERENCE TO RELATED APPLICATION

This application claims the benefit of U.S. Provisional Patent Application No. 61/241,860, the entire contents of which are hereby incorporated by reference.

TECHNICAL FIELD

The present invention relates generally to data communication over a telecommunications network and, more particularly, to modem signaling over a voice channel of a wireless communication system such as a CDMA or GSM cellular system.

BACKGROUND OF THE INVENTION

Data communications over cellular telephone networks can be carried out using various technologies such as packet data wireless connections and modem communication over a voice channel of the cellular network. For this latter means of data communication, the modulated data from the modems must pass through the cellular network equipment, including vocoders designed to compress speech data for more efficient transference. Newer generation vocoders such as those using the EVRC-B codec can interfere with the transmission of modem signaling tones that are otherwise used to establish the data communications between modems over the cellular voice channel.

SUMMARY OF THE INVENTION

In accordance with one embodiment of the invention, there is provided a method of communicating with a modem via a voice channel of a wireless communication system. The method includes the steps of generating a composite carrier comprising a speech component together with a tone having at least one frequency component, and sending the composite carrier to a modem across a voice channel of a wireless communication system.

In accordance with another embodiment of the invention, there is provided a method of communicating data between a vehicle and call center via a voice channel of a wireless communication system. The method includes the steps of (a) establishing a voice channel connection between a vehicle telematics unit and a call center via a wireless cellular network, (b) generating a modem signaling carrier comprising a single frequency tone together with a speech component, (c) sending the modem signaling carrier over the voice channel connection using an EVRC-B vocoder, (d) establishing a data communication session over the voice channel connection in response to the modem signaling carrier, and thereafter (e) carrying out data communications between the vehicle telematics unit and call center during the data communication session.

BRIEF DESCRIPTION OF THE DRAWINGS

One or more preferred exemplary embodiments of the invention will hereinafter be described in conjunction with the appended drawings, wherein like designations denote like elements, and wherein:

FIG. 1 is a block diagram depicting an exemplary embodiment of a communications system that is capable of utilizing the method disclosed herein.

DETAILED DESCRIPTION OF THE PREFERRED EMBODIMENT(S)

The method and system disclosed herein can be used for modem signaling between a mobile device, such as a vehicle telematics unit, and a remote device, such as a call center modem, and is particularly useful in establishing data communication sessions between the mobile and remote device over a voice channel of a wireless communication system such as a CDMA or GSM cellular network. When used for vehicle communications, this permits a regular voice channel connection to be used for data transmission between the vehicle and a remote facility such as a call center.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem 53 for data transmission, an electronic processing device 52, one or more digital memory devices 54, and a dual antenna 56. It should be appreciated that the modem 53 can either be implemented as shown through software that is stored in the telematics unit and is executed by processor 52, or it can be a separate hardware component located internal or external to telematics unit 30. The modem 53 can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem 81 connected between the switch 80 and network 90. Data transmissions are passed via the modem 81 to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Modem Signaling and Data Communication Over a Voice Channel

As noted above, the vehicle 12 and call center 20 can exchange data via a data connection over the wireless communication system 14. Where a wireless cellular network is used, this data communication can be done in various ways, such as via packetized data using technologies supported by the cellular network, or via the a cellular voice channel using the modems 53, 81 carried onboard the vehicle and in the call center. Where modem communication over a voice channel is used, the data is sent from the vehicle using a vocoder 51 that can be included in the cellular chipset 50, and is sent from the call center using a vocoder (not shown) in the base equipment at the cell tower 70. Nominally, the vocoders are used to encode voice data (speech) from both the vehicle occupant (not shown) and the live advisor 86 or VRS 88 to compress the speech prior to wireless transmission over the voice traffic channel. Once received over the wireless network, the encoded speech is then decoded by the other vocoder for the listener. Although various compression codecs can be used, in the illustrated embodiment, an EVRC-B vocoder is used.

In addition to the typical voice data transmission over the voice traffic channel, the communication system 10 enables data communication via this same voice traffic channel and through the vocoders. This is accomplished using a modem 53, 81 on either side of the vocoder; that is, using the first modem 53 incorporated into the onboard vehicle telematics unit 30 and the second modem 81 located at the call center 20. These modems can have the same construction and operation so that only modem 53 will be described, and it will be appreciated that the description of modem 53 applies equally to modem 81.

Regardless of whether the cellular call is initiated at the vehicle 12 or call center 20, once the cellular voice channel connection is established, the transmitting modem can use a predefined tone (e.g., 2225 Hz) or series of tones as a modem signaling carrier to alert the receiving modem of the requested data transmission, and the various attributes of the data connection can then be negotiated by the two modems. Thus, once the receiving modem receives and recognizes the carrier tone, it establishes a data communication session with the transmitting modem via the voice channel for the exchange of data between the vehicle and call center. For certain vocoder codecs, transmission of the pure 2225 Hz or other modem signaling tone can be problematic. For example, in an EVRC-B vocoder, non-speech components are either substantially filtered out or are sent at a relatively low data rate that is undesirable for the intended data communication. To prevent this, the modems 53, 81 utilize a composite carrier that includes both the desired signaling tone and a speech component that fools the vocoder into treating the carrier as speech to be transmitted at a sufficiently high data rate (e.g., at half rate). In the example described below, a single 2225 Hz tone is used as the modem signaling component of the carrier, although it will be appreciated that multi-tone signals and other suitable signal constructs can be used.

The composite carrier can be generated by superimposing or summing the speech component with the pure 2225 Hz tone. This can be done either in the modem 53 when the carrier is to be used, or can be a pre-recorded or pre-made composite carrier that is stored in the modem 53 or in separate memory at the vehicle 12. In generating the composite carrier, the individual attributes of the tone and speech component can be selected such that both: (1) the speech component is sufficiently prominent to cause the vocoder to pass the carrier at a suitable data rate; and (2) the tone is sufficiently prominent to cause the receiving modem to recognize the carrier for its intending signaling purpose. This has been verified experimentally for an EVRC-B vocoder with modem signaling using a 2225 Hz tone. Using an arbitrary speech portion of less than one second applied periodically to the 2225 Hz carrier tone, it was determined that by providing a power ratio of the speech component to the carrier tone in the range of −12 dB to −20 dB, the composite carrier tone was successfully transmitted via the vocoder and recognized by the receiving modem. This was verified by testing different power ratios from −24 dB up to −8 dB in 2 dB increments. Where the speech component energy was above −12 dB relative to the tone, the composite carrier could be successfully transmitted, but interfered with tone detection by the receiving modem. Where the speech component was attenuated more the −20 dB relative to the tone, there was not enough energy in the speech component of the waveform to cause the EVRC-B half-rate encoder to pass the composite carrier over the voice channel. These limits of operation were experimentally verified only for one particular test setup using one particular speech component, and other implementations will result in a different workable power ratio between the tone and speech component. In general, a preferred composite carrier will have a power ratio of speech to tone that is less than zero decibels but still sufficient to permit detection of the tone by the receiving modem. Apart from the power ratio itself, the particular spectral makeup of the speech component within the audio frequency range may be determined by testing or modeling to influence the vocoder operation, and this can be used in designing a suitable composite carrier, as will be understood by those skilled in the art.

The speech component itself can be a segment of human speech, can be synthesized speech, or can be any other suitable speech-like audio signal suitable for causing the vocoder to pass the composite carrier through at a suitable data rate. Thus, preferably the speech component comprises multiple spectral components in the audio frequency range that each vary over time in amplitude or frequency, or both. The speech component can be a continuous or repeating signal applied continuously to the carrier tone, or can be a segment that is periodic or otherwise intermittent.

One advantage of this approach to modem signaling is that it can be used not only with newly developed equipment designed specifically to utilize the composite carrier signal, but also with legacy equipment that only looks for the pure tone. This enables use of the composite carrier approach by call center modems to signal vehicles having existing (legacy) modems installed.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of communicating with a modem via a voice channel of a wireless communication system, comprising the steps of:
   generating a composite carrier comprising a speech component together with a single-frequency signaling tone, wherein the generating step further comprises generating the composite carrier such that the power ratio of the speech component to the single-frequency signaling tone is under zero decibels; and
   sending the composite carrier including the speech component and the single-frequency signaling tone to a modem across a voice channel of a wireless communication system.

2. The method set forth in claim 1, wherein the generating step further comprises generating the composite carrier such that the power ratio of the speech component to the single-frequency signaling tone is less than −12 dB.

3. The method set forth in claim 2, wherein the generating step further comprises generating the composite carrier such that the power ratio of the speech component to the single-frequency signaling tone is greater than −20 dB.

4. The method set forth in claim 1, wherein the speech component comprises multiple spectral components in the audio frequency range that each vary over time in amplitude or frequency, or both.

5. The method set forth in claim 4, wherein the speech component comprises human speech.

6. The method set forth in claim 4, wherein the speech component comprises synthesized speech.

7. The method set forth in claim 1, wherein the single-frequency signaling tone is continuous and the speech component is intermittent.

8. A method of communicating data between a vehicle and call center via a voice channel of a wireless communication system, comprising the steps of:
   establishing a voice channel connection between a vehicle telematics unit and a call center via a wireless cellular network;
   generating a modem signaling carrier comprising a single frequency tone together with a speech component, wherein the modem signaling carrier has a power ratio of speech component to single frequency tone that is less than zero decibels (dB);
   sending the modem signaling carrier over the voice channel connection using an EVRC-B vocoder;
   establishing a data communication session over the voice channel connection in response to the modem signaling carrier; and thereafter
   carrying out data communications between the vehicle telematics unit and call center during the data communication session.

9. The method set forth in claim 8, wherein the generating step further comprises generating the modem signaling carrier such that the power ratio of the speech component to the tone is less than −12 dB.

10. The method set forth in claim 9, wherein the generating step further comprises generating the modem signaling carrier such that the power ratio of the speech component to the tone is greater than −20 dB.

11. The method set forth in claim 8, wherein the speech component comprises multiple spectral components in the audio frequency range that each vary over time in amplitude or frequency, or both.

12. The method set forth in claim 11, wherein the speech component comprises human speech.

13. The method set forth in claim 11, wherein the speech component comprises synthesized speech.

14. The method set forth in claim 8, wherein the tone is continuous and the speech component is intermittent.

* * * * *